United States Patent
Assaf et al.

(10) Patent No.: US 7,069,136 B2
(45) Date of Patent: Jun. 27, 2006

(54) ACCELERATION BASED CRUISE CONTROL SYSTEM

(75) Inventors: Tameem K. Assaf, Troy, MI (US);
Joseph R. Dulzo, Novi, MI (US);
Onassis Matthews, Novi, MI (US)

(73) Assignee: General Motors Corporation, Detroit, MI (US)

( * ) Notice: Subject to any disclaimer, the term of this patent is extended or adjusted under 35 U.S.C. 154(b) by 319 days.

(21) Appl. No.: 10/657,015

(22) Filed: Sep. 5, 2003

(65) Prior Publication Data

US 2005/0065703 A1 Mar. 24, 2005

(51) Int. Cl.
*F02D 41/00* (2006.01)
*F02D 1/00* (2006.01)

(52) U.S. Cl. .......................... 701/93; 701/97; 180/169

(58) Field of Classification Search .................. 701/93, 701/94, 91, 96, 97, 95, 110; 180/169, 170, 180/171; 123/361, 399, 396; 73/118.2
See application file for complete search history.

(56) References Cited

U.S. PATENT DOCUMENTS

| | | | |
|---|---|---|---|
| 4,905,154 A * | 2/1990 | Strong et al. | 701/93 |
| 5,625,558 A * | 4/1997 | Togai et al. | 701/93 |
| 6,304,810 B1 * | 10/2001 | Westerberg | 701/93 |
| 6,349,700 B1 * | 2/2002 | Buckland et al. | 123/352 |
| 6,805,094 B1 * | 10/2004 | Hashimoto et al. | 123/396 |
| 6,851,304 B1 * | 2/2005 | Cullen et al. | 73/118.2 |
| 2003/0154955 A1 * | 8/2003 | Russell et al. | 123/348 |

* cited by examiner

*Primary Examiner*—Dalena Tran
(74) *Attorney, Agent, or Firm*—Christopher DeVries (57) ABSTRACT

A cruise control system for a vehicle includes a throttle and a controller. The controller determines an open-loop speed compensation factor and calculates a closed-loop speed compensation factor. The controller determines a throttle area based on the open-loop speed compensation factor and the closed-loop speed compensation factor and operates the throttle based on the throttle area.

36 Claims, 5 Drawing Sheets

ACCELERATION BASED CRUISE CONTROL SYSTEM

FIELD OF THE INVENTION

The present invention relates to vehicle cruise control systems, and more particularly to acceleration-based cruise control system.

BACKGROUND OF THE INVENTION

Many vehicles include a cruise control system that allows a driver to control vehicle speed during operation of the cruise control system without depressing an accelerator pedal. A controller maintains the vehicle speed through varying road and vehicle conditions. The driver can manipulate the cruise control using on/off, set/coast and resume/accelerate switches as well as using a brake pedal and/or a clutch pedal.

Originally, cruise control systems were developed for vehicles using mechanical throttle control (MTC). MTC regulates throttle movement via a mechanical cable that opens and/or closes the throttle. The movement of the throttle is proportional to driver input through the accelerator pedal. When the cruise control system is activated, a stepper motor drives the mechanical cable linkage to the throttle. The stepper motor includes an electronic control unit (ECU) that does not receive data from a controller. In effect, the MTC only receives input from a transmission vehicle speed sensor. The speed sensor, however, is susceptible to excessive noise. As a result, cruise control systems use a speed error approach, which compares vehicle speed to a desired speed.

Advancements in vehicle technology include less noisy vehicle speed sensors and electronic throttle control (ETC), which replaced MTC. The advent of ETC enables modification of the cruise control system based on controller parameters that were previously inaccessible using the stepper motor architecture. However, instead of developing modern cruise control algorithms, pre-existing cruise control algorithms have been adapted to meet the changing performance requirements.

SUMMARY OF THE INVENTION

Accordingly, the present invention provides a cruise control system for a vehicle. The cruise control system includes a throttle and a controller. The controller determines an open-loop speed compensation factor and calculates a closed-loop speed compensation factor. The controller determines a throttle area based on the open-loop speed compensation factor and the closed-loop speed compensation factor and operates the throttle based on the throttle area.

In one feature, the control system further includes a pressure sensor that sends a pressure signal to the controller. The controller adjusts the throttle area based on the pressure signal.

In another feature, the cruise control system further includes a manifold air flow (MAF) sensor that sends a MAF signal to the controller and a vehicle speed sensor that sends a vehicle speed signal to the controller. The open-loop speed compensation factor is based on the MAF signal and the vehicle speed signal.

In another feature, the closed-loop speed compensation factor is based on an integral term and a proportional term that are calculated by the controller. The proportional term is determined based on a proportional coefficient and an error. The proportional coefficient is determined from a look-up table based on a vehicle speed signal and a manifold air flow (MAF) signal. The error is based on said cruise control mode.

In one feature, when said cruise control mode is engaged, the error is a difference between a vehicle speed and a cruise speed.

In another feature, when the cruise control mode is one of a group comprising acceleration from engaged and coast, the error is a sum of a speed error and an acceleration error.

In another feature, when the cruise control mode is overspeed resume, the error is a difference between a speed error and an acceleration error.

In another feature, when the cruise control mode is one of a group comprising acceleration standby enabled and resume, the error is equal to an acceleration error.

In still another feature, when said cruise control mode is one of a group comprising tap-up and tap-down, the error is equal to a sum of a speed error and a timed acceleration error.

In yet another feature, the controller determines whether an enable is flagged. The closed-loop speed compensation factor is equal to a prior closed-loop speed compensation factor when the enable is not flagged.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
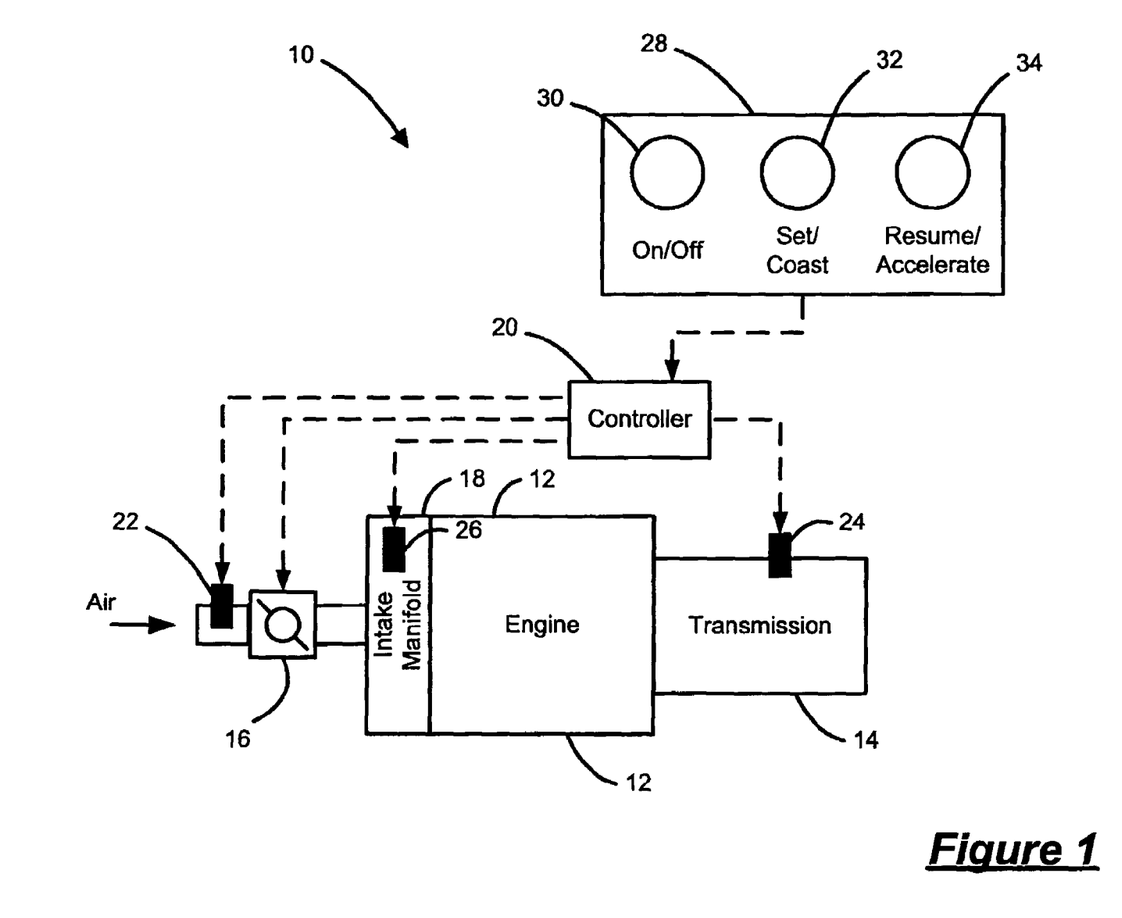
FIG. 1 is a functional block diagram of a vehicle with a proportional integral (PI) cruise control system according to the present invention.

Referring now to FIG. 1, a schematic illustration of a vehicle 10 is shown. The vehicle 10 includes an engine 12 that drives a transmission 14, which provides driving power to wheels (not shown) at selective gear ratios. The engine 12 includes a throttle 16 that regulates air flow into an intake manifold 18. Air is drawn into the engine 12 through the throttle 16 and intake manifold 18 and is mixed with fuel. The air and fuel mixture is combusted in cylinders (not shown) of the engine 12 to produce the driving force.

The vehicle 10 includes a controller 20 that regulates operation of the engine 12 based on the proportional integral (PI) cruise control system of the present invention. The controller 20 receives signals from a mass air flow (MAF) sensor 22, a vehicle speed sensor 24 associated with the transmission 14, a manifold absolute pressure (MAP) sensor 26 and a cruise control interface 28. The cruise control interface 28 includes an on/off switch 30, a set/coast switch 32 and a resume/accelerate switch 34. The switch signals are either high or low. For example, when off, the on/off switch signal is low (i.e., 0) and when on the on/off switch signal is high (i.e., 1). Similarly, the set/coast signal and resume accelerate signal are normally low (i.e., 0) and are high (i.e., 1) when depressed.

The on/off switch 30 enables a driver to turn the cruise control system on or off. The set/coast switch 32 enables the driver to set a vehicle speed in memory ($S_{MEM}$) or coast while the cruise control system is on. By tapping the set/coast switch the driver sets $S_{MEM}$ at the present vehicle speed. By holding the set/coast switch 32 depressed, the vehicle coasts. The resume/accelerate switch 34 enables a driver to resume $S_{MEM}$ from another speed or accelerate the vehicle speed from $S_{MEM}$ while operating in cruise control. For example, if the vehicle 10 was operating in cruise control and the driver brakes, the resume function enables the driver to resume cruise control by automatically accelerating the vehicle back to $S_{MEM}$. If the vehicle 10 is operating in cruise to maintain $S_{MEM}$, the driver can hold the resume/accelerate switch 34 depressed to accelerate the vehicle from $S_{MEM}$. Additionally, the driver can tap the resume/accelerate switch 34 to increase $S_{MEM}$ by one mph or the set/coast switch 32 to decrease $S_{MEM}$ by one mph.

The cruise control system operates in eleven different modes including: disabled, standby disabled, standby enabled, engaged, resume, overspeed resume, accelerate from engaged, accelerate from standby enabled, coast, tap-up and tap-down. Resume, overspeed resume, accelerate from engaged, accelerate from standby, engaged, coast, tap-up and tap-down modes are transient modes.

In the disabled mode, the on/off switch 30 is in the off position, cruise control is non-operative and $S_{MEM}$ is cleared. In the standby disabled mode, cruise control exits the disabled mode when the on/off switch 30 is in the on position and the brake before cruise security feature is met. The brake before cruise security feature ensures brake inputs are read into the PI control properly. In the standby enabled mode, the on/off switch 30 is in the on position and the set/coast and resume/accelerate signals are zero.

The cruise control transitions from the standby enabled mode to the engaged mode on the falling edge of a set/coast signal. In other words, the cruise control enters the engaged mode from any transient mode (i.e. resume, overspeed resume, accelerate from engaged, accelerate from standby enabled, coast, tap-up or tap-down) on the falling edge of the set/coast or resume/accelerate signals. In the engaged mode, the PI control maintains $S_{VEH}$ at $S_{MEM}$. When entering engaged mode from standby enabled, accelerate from engaged, coast or accelerate from standby enabled modes, $S_{MEM}$ is set equal to $S_{VEH}$.

In the resume mode, the PI control resumes (i.e. accelerates to) the last $S_{MEM}$. From the accelerate mode or from the standby enabled mode, the resume mode is entered if a timer is less than a resume to accelerate transition time ($T_{RESACC}$) and $S_{VEH}$ is less than $S_{MEM}$ (i.e., an underspeed condition). From overspeed resume mode, the resume mode is entered if the timer is greater than or equal to $T_{RESACC}$ and the falling edge of the resume/accelerate signal occurs. Alternatively, the resume mode is entered from the overspeed resume mode if the timer is less than $T_{RESACC}$, the falling edge of the resume accelerate signal occurs and $S_{VEH}$ is less than $S_{MEM}$.

In the overspeed resume mode, the PI control decelerates the vehicle to the last $S_{MEM}$. The overspeed resume mode is entered from the standby enabled mode on the falling edge of the resume/accelerate signal if $S_{ERROR}$ is greater than a maximum allotted error ($E_{MAX}$) for cruise to go into the accelerate from standby enabled mode.

The accelerate from engaged mode is entered into when the resume/accelerate switch is depressed and a timer is greater than a tap-up to acceleration time threshold ($T_{TAPUPTRANS}$). In the accelerate from engaged mode, the PI control accelerates the vehicle until the resume/accelerate switch 34 is released. The accelerate from engaged mode has no effect on $S_{MEM}$.

In the accelerate from standby enabled mode, the PI control remains in this mode until the resume/accelerate switch 34 is released. Once the resume/accelerate switch 34 is released the PI control enters the resume mode and accelerates the vehicle until $S_{MEM}$ is achieved. The accelerate from standby mode is entered on the rising edge of the resume/accelerate switch signal if the $S_{ERROR}$ is less than a maximum error ($S_{ERRORMAX}$). The accelerate from standby enabled mode has no effect on $S_{MEM}$.

The coast mode is entered into from the resume mode on the falling edge of the set/coast switch signal. The coast mode is entered into from the tap-down mode if the set/coast signal is high and a timer is greater than a tap-down to coast transition time threshold ($T_{TAPDWNCST}$). In the coast mode, the throttle area is reduced and the vehicle decelerates until the set/coast switch is released. The coast mode has no effect on $S_{MEM}$.

The tap-up mode increases the vehicle speed by one mile per hour (mph). The tap-up mode is entered from the overspeed resume, tap-down, accelerate from engaged, tap-up, engaged or coast modes if the rising edge of the resume/accelerate switch signal occurs. The PI control also increments $S_{MEM}$ by one mph. Conversely, the tap-down mode decreases the vehicle speed by one mile per hour (mph). The tap-down mode is entered from the tap-down, tap-up, engaged, accelerate from engaged or accelerate from standby enabled modes if the rising edge of the set/coast switch signal occurs. The PI control also decrements $S_{MEM}$ by one mph. The tap-up and tap-down modes occur in 1 second increments. Upon the expiration of 1 second after the corresponding switch has been tapped, the cruise control mode goes back to engaged with $S_{MEM} \pm 1$ mph.

Figure 2:
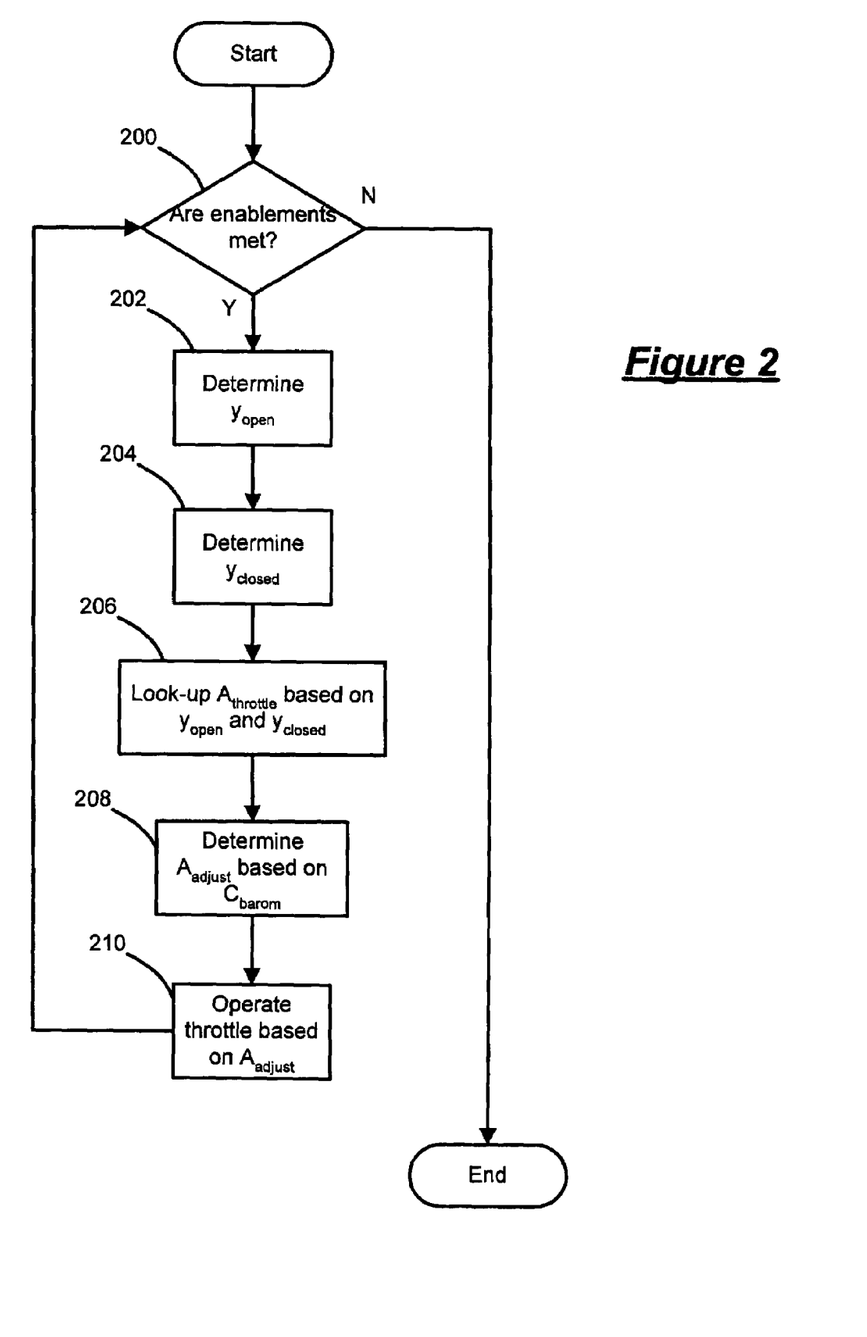
FIG. 2 is a flowchart illustrating steps that are performed by the PI cruise control of the present invention.

Referring now to FIG. 2, the PI cruise control of the present invention includes open-loop and a closed-loop components. In step 200, control determines whether certain enablements are met (i.e., is the vehicle operating in a cruise control mode), as discussed in further detail below. If true, control continues in step 202. Otherwise, control ends. In step 202, control determines the open-loop component ($y_{open}$). $y_{open}$ is determined from a look-up table based on vehicle speed and MAF and compensates for gain fluctuations in speed. In step 204, control determines the closed-loop component ($y_{closed}$). $y_{closed}$ includes a proportional term and an integral term, as described in further detail hereinbelow.

In step 206, a throttle area ($A_{throttle}$) is determined based on $y_{open}$ and $y_{closed}$. More specifically, a difference between $y_{open}$ and $y_{closed}$ is determined. $A_{throttle}$ is determined from a look-up table based on this difference. In step 208, $A_{throttle}$ is adjusted by a barometric compensation factor ($C_{barom}$) to determine an adjusted throttle area ($A_{adjust}$). $C_{barom}$ is determined by the controller 20 based on the pressure signal from the MAP sensor 26. In step 210, the controller operates the throttle based on $A_{adjust}$.

Figure 3:
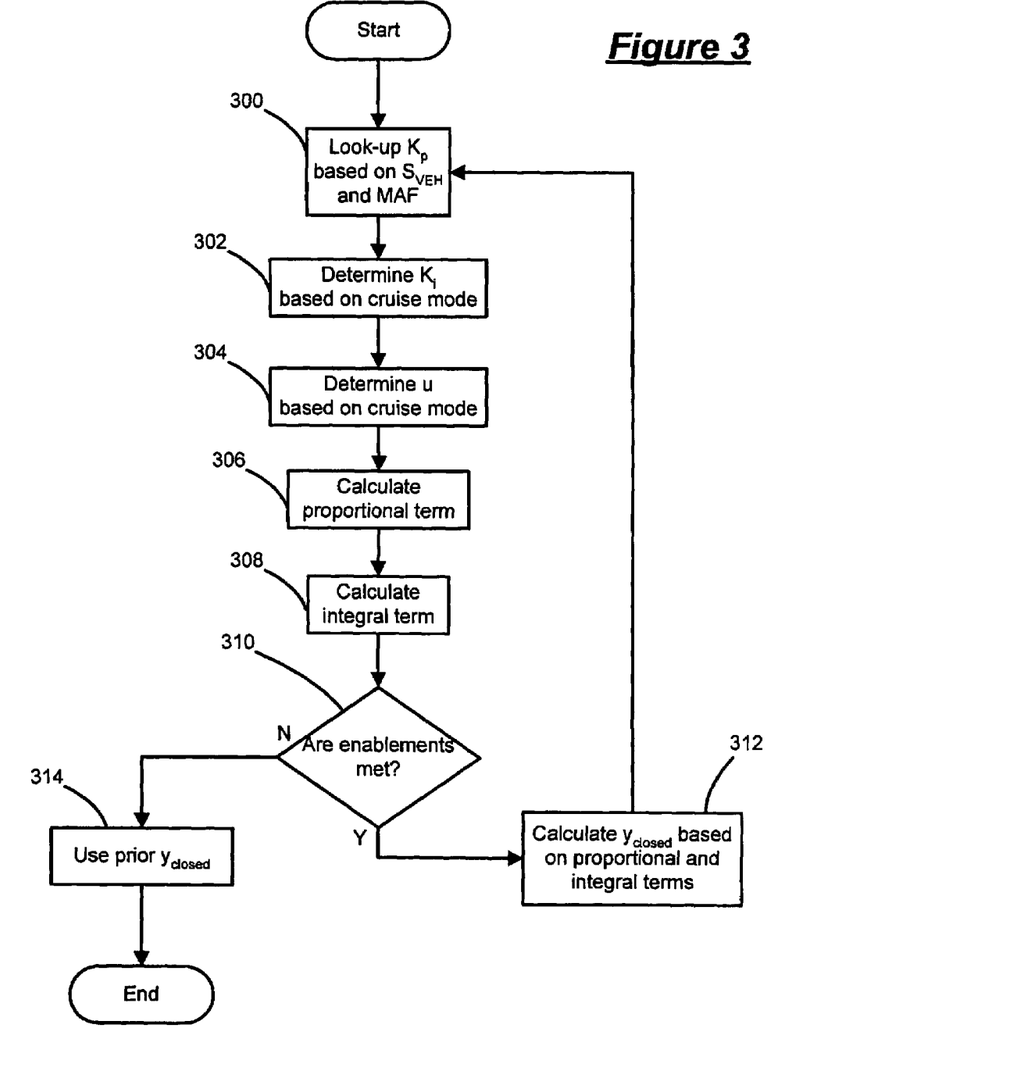
FIG. 3 is a flowchart illustrating steps for calculating a closed-loop speed compensation factor of the PI cruise control.

Referring now to FIG. 3, calculation of $y_{closed}$ will be described in detail. In step 300, control determines a proportional coefficient ($K_p$) from a look-up table based on $S_{VEH}$ and MAF. In step 302, control determines an integral coefficient ($K_i$) based on the cruise mode the vehicle is currently operating in. More specifically, $K_i$ is a calibration factor that is pre-programmed by a calibration engineer for the particular cruise control mode. $K_i$ is calibrated to provide a desired driving feel for the particular vehicle. In step 304, control determines an error input (u) based on the cruise mode. Determination of u is described in further detail below with reference to FIG. 5.

In step 306, control calculates the proportional term as the product of $K_p$ and u. In step 308, control calculates the integral term. Calculation of the integral term is described in further detail below with reference to FIG. 4. Control determines whether enables are met, in step 310. If true, control continues in step 312. Otherwise control continues in step 314. To determine whether the enables are met, control checks the cruise control mode, the throttle control source and the value of u. In order for the enables to be met the cruise control mode must be in one of the active modes (i.e., coast, accelerate from engaged, accelerate from standby, resume, engaged, tap-up, tap-down or overspeed resume). Additionally, the throttle control source must be one of cruise, idle or pedal. The throttle control source is an electronic throttle control (ETC) parameter that refers to which source is controlling the throttle position.

If the throttle control source is one of either pedal or idle, u must be less than zero in order for the enables to be met. This prevents wind-up of the integrator term. Wind-up is seen when the integrator term continues to demand a smaller and smaller $A_{throttle}$ despite the throttle control source not being in cruise. If the throttle control source transitions back to cruise, the throttle would initially snap shut. More specifically, if u is positive then $A_{throttle}$ decreases and if negative $A_{throttle}$ increases. Therefore, by preventing the integrator term from decreasing $A_{throttle}$ while the throttle control source is pedal or idle, a sharp downward ramp is prevented when transitioning to cruise.

In step 312, control calculates $y_{closed}$ based on the proportional and integral terms and loops back to step 300. More specifically, control sums the proportional and integral terms. However, assuming the enables are not met, control sets $y_{closed}$ to the most recent (i.e., previous) value calculated in step 314. Regardless of the manner in which $y_{closed}$ is determined, $y_{closed}$ is used to determine $A_{throttle}$ as described in detail above.

Figure 4:
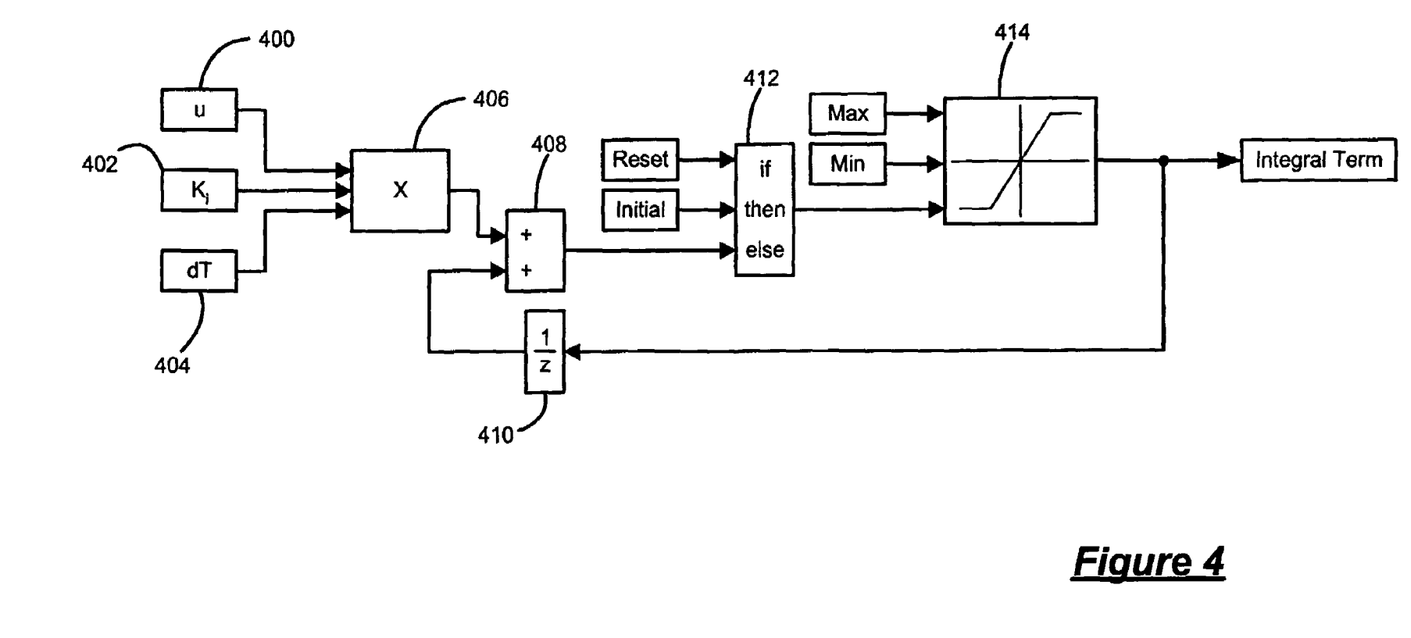
FIG. 4 is a signal flow diagram illustrating calculation of an integral term of the closed-loop speed compensation factor.

Referring now to FIG. 4, a signal flow diagram illustrates calculation of the integral term. The inputs include u, $K_i$ and a sampling rate (dT), indicated at 400, 402 and 404, respectively. An exemplary sampling rate is 12.5 milliseconds. A multiplier 406 determines the product of the inputs. The output of the multiplier 406 is sent to a summer 408. The summer 408 adds the multiplier output to a previously determined integral term provided by a unit delay 410. A conditional circuit 412 determines whether a reset is present. The reset is present when the enablements are not met. If the reset is present (i.e., enablements not met), the conditional circuit output is a predefined initial value. An exemplary initial value is zero. If the reset is not present (i.e., enablements are met) the conditional circuit output is the output of the summer 408. A limiter 414 limits the conditional circuit output between maximum and minimum values to provide the integral term.

Figure 5:
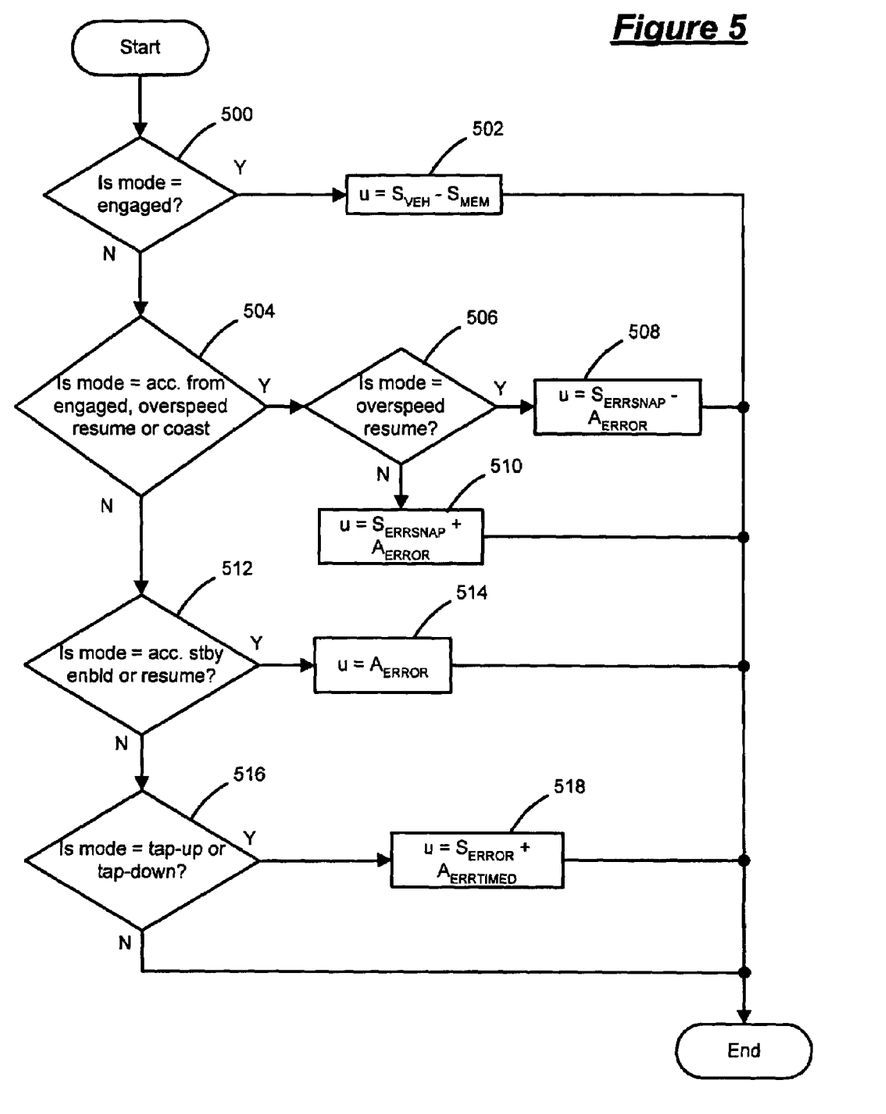
FIG. 5 is a flowchart illustrating calculation of an error of the PI cruise control.

Referring now to FIG. 5, determination of u will be described in detail. As discussed briefly above, u is based on the particular cruise control mode. In step 500, control determines whether the cruise control mode is engaged. If so, control continues in step 502. Otherwise, control continues in step 504. In step 502, u is calculated as the difference between $S_{VEH}$ and $S_{MEM}$.

In step 504, control determines whether the cruise control mode is one of accelerate from engaged, overspeed resume or coast. If the cruise mode is one of these three, control continues in step 506. Otherwise, control continues in step 512. In step 506, control determines whether the cruise control mode is overspeed resume. If true, control continues in step 508. Otherwise, control continues in step 510.

In step 508, u is determined as the difference between a snap-shot of speed error ($S_{ERRSNAP}$) and an acceleration error ($A_{ERROR}$). $S_{ERRSNAP}$ is determined as the difference between $S_{VEH}$ and $S_{MEM}$ at the point of transition into the overspeed resume mode (i.e., at the edge of the signal as it transitions from low to high). $A_{ERROR}$ is the difference between an actual acceleration and a desired acceleration, multiplied by a timer coefficient. The actual acceleration is determined as the difference between $S_{VEH}$ and a delayed vehicle speed sample ($S_{DELAY}$). An exemplary delay time is 100 milliseconds, however, the delay time can vary as desired. The desired acceleration is a calibrated value that is determined based on the particular cruise control mode. The desired acceleration is pre-programmed by a calibration engineer for the particular cruise control mode and is calibrated to provide a desired driving feel for the particular vehicle. The countdown timer coefficient determines how long $A_{ERROR}$ should be taken into account for the particular cruise control mode.

In step 510, u is determined as the sum of the snap-shot of speed error ($S_{ERRSNAP}$) and the acceleration error ($A_{ERROR}$). In this case, however, $S_{ERRSNAP}$ is determined as the difference between $S_{VEH}$ and $S_{MEM}$ at the point of transition into either the accelerate from engaged or coast modes (i.e., at the edge of the signal as it transitions from low to high). $A_{ERROR}$ is determined as described immediately above.

In step 512, control determines whether the cruise control mode is accelerate from standby enabled or resume. If the cruise control mode is either, control continues in step 514. If the cruise control mode is neither, control continues in step 516. In step 514, control sets u equal to the $A_{ERROR}$, which is determined as described above.

In step 516, control determines whether the cruise control mode is tap-up or tap-down. If the cruise control is either, control continues in step 518. If the cruise control mode is neither, control ends. In step 518, u is calculated as the sum of $S_{ERROR}$ ($S_{VEH}-S_{MEM}$) and a timed acceleration error ($A_{ERRTIMED}$). $A_{ERRTIMED}$ is determined by setting the countdown timer coefficient such that $A_{ERROR}$ is only taken into account for 1 second. More specifically, the initial value of the countdown timer is equal to 1 divided by a tap rate ($R_{TAP}$) calculated over a 100 ms time slice, multiplied by 10. This provides $R_{TAP}$ over a 1 second period. As a result, the countdown timer outputs a 0 after the initial value has decreased for 1 s. As long as the countdown timer is greater than 0, the output will be a 1.

In summary, the PI control of the present invention determines $y_{open}$ and $y_{closed}$. $A_{throttle}$ is based on the difference between $y_{open}$ and $y_{closed}$. $y_{open}$ is determined from a look-up table and $y_{closed}$ is based on a proportional and an integral term. The proportional and integral terms are based on u. u is based on the particular cruise mode and accounts for errors in vehicle acceleration. The proportional term is calculated as the product of $K_p$ and u. The integral term is calculated as the product of u, $K_i$ and dT summed with a previously determined integral term. However, if the enablements are not met, the reset is indicated and the integral term is set to the initial value. Further, the value of the integral term is capped between a maximum and a minimum.

Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. A cruise control system for a vehicle, comprising:
a throttle;
a controller that monitors a cruise control mode of said vehicle, that determines an open-loop speed compensation factor, that calculates a closed-loop speed compensation factor based on a proportional term and an integral term, which is determined based on said cruise control mode, that determines a throttle area based on said open-loop speed compensation factor and said closed-loop speed compensation factor and that operates the throttle based on said throttle area.

2. The cruise control system of claim 1, further comprising a manifold absolute pressure (MAP) sensor that sends a pressure signal to said controller, wherein said controller adjusts said throttle area based on said pressure signal.

3. The cruise control system of claim 1, further comprising: a manifold air flow (MAF) sensor that sends a MAF signal to said controller; and a vehicle speed sensor that sends a vehicle speed signal to said controller, wherein said open-loop speed compensation factor is based on said MAF signal and said vehicle speed signal.

4. The cruise control system of claim 1, wherein said proportional term is determined based on a proportional coefficient and an error.

5. The cruise control system of claim 4, wherein said proportional coefficient is determined from a look-up table based on a vehicle speed signal and a manifold air flow (MAF) signal.

6. The cruise control system of claim 4, wherein said error is based on said cruise control mode.

7. The cruise control system of claim 6, wherein when said cruise control mode is engaged, said error is a difference between a vehicle speed and a cruise speed.

8. The cruise control system of claim 6, wherein when said cruise control mode is one of a group comprising acceleration from engaged and coast, said error is a sum of a speed error and an acceleration error.

9. The cruise control system of claim 6, wherein when said cruise control mode is overspeed resume, said error is a difference between a speed error and an acceleration error.

10. The cruise control system of claim 6, wherein when said cruise control mode is one of a group comprising acceleration standby enabled and resume, said error is equal to an acceleration error.

11. The cruise control system of claim 6, wherein when said cruise control mode is one of a group comprising tap-up and tap-down, said error is equal to a sum of a speed error and a timed acceleration error.

12. The cruise control system of claim 1, wherein said controller determines whether an enable is flagged, wherein said closed-loop speed compensation factor is equal to a prior closed-loop speed compensation factor when said enable is not flagged.

13. A method of controlling a speed of a vehicle using a cruise control system, comprising:
monitoring a cruise control mode of said vehicle;
determining an open-loop speed compensation factor;
calculating a closed-loop speed compensation factor based on a proportional term and an integral term, which is determined based on said cruise control mode;
determining a throttle area based on said open-loop speed compensation factor and said closed-loop speed compensation factor; and
operating a throttle based on said throttle area.

14. The method of claim 13, further comprising adjusting said throttle area based on barometric pressure.

15. The method of claim 13, wherein said open-loop speed compensation factor is based on a vehicle speed and a manifold air flow.

16. The method of claim 15, wherein said open-loop speed compensation factor is determined from a look-up table.

17. The method of claim 13, wherein said proportional term is determined based on a proportional coefficient and an error.

18. The method of claim 17, wherein said proportional coefficient is determined from a look-up table based on a vehicle speed and a manifold air flow.

19. The method of claim 17, wherein said error is based on a cruise control mode.

20. The method of claim 19, wherein when said cruise control mode is engaged, said error is a difference between a vehicle speed and a cruise speed.

21. The method of claim 19, wherein when said cruise control mode is one of a group comprising acceleration from engaged and coast, said error is a sum of a speed error and an acceleration error.

22. The method of claim 19, wherein when said cruise control mode is overspeed resume, said error is a difference between a speed error and an acceleration error.

23. The method of claim 19, wherein when said cruise control mode is one of a group comprising acceleration standby enabled and resume, said error is equal to an acceleration error.

24. The method of claim 19, wherein when said cruise control mode is one of a group comprising tap-up and tap-down, said error is equal to a sum of a speed error and a timed acceleration error.

25. The method of claim 13, further comprising determining whether an enable is flagged, wherein said closed-loop speed compensation factor is equal to a prior closed-loop speed compensation factor when said enable is not flagged.

26. A method of controlling a speed of a vehicle using a cruise control system, comprising:
monitoring a cruise control mode of said vehicle;
determining an error factor based on a particular cruise control mode and at least one of a speed error and an acceleration error;
calculating a closed-loop speed compensation factor based on said error factor;
determining a throttle area based on said closed-loop speed compensation factor; and
operating a throttle based on said throttle area.

27. The method of claim 26, further comprising determining an open-loop speed compensation factor based on a vehicle speed and a manifold air flow, wherein said throttle area is further based on said open-loop speed compensation factor.

28. The method of claim 27, wherein said open-loop speed compensation factor is determined from a look-up table.

29. The method of claim 26, further comprising adjusting said throttle area based on barometric pressure.

30. The method of claim 26, wherein said closed-loop speed compensation factor includes a proportional term and an integral term.

31. The method of claim 30, wherein said proportional term is determined based on a proportional coefficient and said error factor.

32. The method of claim 31, wherein said proportional coefficient is determined from a look-up table based on a vehicle speed and a manifold air flow.

33. The method of claim 26, wherein when said cruise control mode is engaged, said acceleration error is zero and said speed error is a difference between a vehicle speed and a cruise speed.

34. The method of claim 26, wherein when said cruise control mode is one of a group comprising acceleration from engaged, overspeed resume, acceleration from standby enabled, resume and coast, said acceleration error is a difference between an actual acceleration and a desired acceleration.

35. The method of claim 26, wherein when said cruise control mode is one of a group comprising tap-up and tap-down, said acceleration error is based on a timed value of a difference between an actual acceleration and a desired acceleration.

36. The method of claim 26, further comprising determining whether an enable is flagged, wherein said closed-loop speed compensation factor is equal to a prior closed-loop speed compensation factor when said enable is not flagged.

* * * * *